United States Patent
Wilding et al.

(10) Patent No.: US 9,266,432 B2
(45) Date of Patent: Feb. 23, 2016

(54) OPERATING SYSTEM FOR DRIVER ASSISTANCE SYSTEMS OF A MOTOR VEHICLE AND MOTOR VEHICLE WITH AN OPERATING SYSTEM OF THIS KIND

(71) Applicant: AUDI AG, Ingolstadt (DE)

(72) Inventors: Werner Wilding, Walting (DE); Benjamin Schulz, Buxheim (DE); Tobias Muhr, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/408,024

(22) PCT Filed: Jun. 11, 2013

(86) PCT No.: PCT/EP2013/001697
§ 371 (c)(1),
(2) Date: Dec. 15, 2014

(87) PCT Pub. No.: WO2013/185901
PCT Pub. Date: Dec. 19, 2013

(65) Prior Publication Data
US 2015/0175005 A1    Jun. 25, 2015

(30) Foreign Application Priority Data
Jun. 15, 2012 (DE) .......................... 10 2012 011 887

(51) Int. Cl.
*B62D 1/00* (2006.01)
*B62D 1/02* (2006.01)
*B62D 6/00* (2006.01)
*B60K 37/06* (2006.01)
*B60K 35/00* (2006.01)

(52) U.S. Cl.
CPC ................ *B60K 37/06* (2013.01); *B60K 35/00* (2013.01); *B60K 2350/928* (2013.01)

(58) Field of Classification Search
USPC ............................................................ 701/36
See application file for complete search history.

(56) References Cited

U.S. PATENT DOCUMENTS

| 6,050,359 A | * | 4/2000 | Mouri et al. | 180/415 |
| 7,489,303 B1 | * | 2/2009 | Pryor | 345/173 |
| 7,858,891 B2 | * | 12/2010 | Strohband et al. | 200/406 |
| 2011/0241850 A1 | | 10/2011 | Bosch et al. | |
| 2011/0241862 A1 | * | 10/2011 | Debouk et al. | 340/439 |

FOREIGN PATENT DOCUMENTS

| DE | 102012011887.2 | 6/2012 |
| WO | 87/06893 | 11/1987 |
| WO | PCT/EP2013/001697 | 6/2013 |

OTHER PUBLICATIONS

W. Kuechler et al., "Technologien für eine neuartige HMI-Gestaltung," ATZ elecktronik, Apr. 2010, 6 pages.

(Continued)

*Primary Examiner* — Yonel Beaulieu
(74) *Attorney, Agent, or Firm* — Staas & Halsey LLP

(57) ABSTRACT

An operating system for driver assistance systems of a motor vehicle, has a plurality of operating elements which can be assigned to at least one operating group and which are disposed solely for operating driver assistance systems that can be assigned to at least one group. A corresponding function for operating the driver assistance systems can be assigned to each of the operating elements on the basis of adjustable combinations of operating modes of the driver assistance systems. The operating elements are disposed in order to operate an adaptive cruise control system, and in order to operate a lane departure warning system.

20 Claims, 1 Drawing Sheet

(56) References Cited

OTHER PUBLICATIONS

German Office Action for German Priority Patent Application No. 10 2012 011 887.2, issued Jun. 10, 2013, 6 pages.

English language International Search Report for PCT/EP2013/001697, mailed Oct. 1, 2013, 2 pages.

English Language Translation of the International Preliminary Report on Patentability mailed Dec. 31, 2014 for corresponding International Patent Application No. PCT/EP2013/001697, 8 pages.

\* cited by examiner

OPERATING SYSTEM FOR DRIVER ASSISTANCE SYSTEMS OF A MOTOR VEHICLE AND MOTOR VEHICLE WITH AN OPERATING SYSTEM OF THIS KIND

CROSS REFERENCE TO RELATED APPLICATIONS

This application is based on and hereby claims priority to International Application No. PCT/EP2013/001697 filed on Jun. 11, 2013 and German Application No. 10 2012 011 887.2 filed on Jun. 15, 2012, the contents of which are hereby incorporated by reference.

BACKGROUND

The invention relates to an operating system for driver assistance systems of a motor vehicle and to a motor vehicle having such an operating system.

Various switches and/or levers at the driver's place are used to activate the driver assistance systems which are made available in a modern motor vehicle and to control various functions. For example, many of the driver assistance systems are controlled by switches which are mounted on a steering wheel or by what are referred to as steering column control stalks.

As a result of the increasing number of functions and new stages of automation of such driver assistance systems and the limited space available in the direct reach of the driver, the selection and activation of the driver assistance systems is becoming more and more confusing. The operating elements for controlling or operating the driver assistance systems are to a certain extent no longer directly visible to the driver. Overall, the driver can be distracted from the events on the roadway by the increasing number of driver assistance systems and the operating elements which are provided for them. Furthermore, the higher operating demands in terms of comfort and the simplest possible operation capability are met only to an insufficient degree by currently widespread operating systems for driver assistance systems.

SUMMARY

One potential object is therefore to make available an operating system for driver assistance systems of a motor vehicle and a motor vehicle having such an operating system by which improved control of the driver assistance systems is made possible.

The inventors propose an operating system for driver assistance systems of a motor vehicle comprises a plurality of operating elements which can be assigned to at least one operating group and which are configured exclusively for operating driver assistance systems which can be assigned to at least one group, wherein a corresponding function for operating the driver assistance systems can be assigned to each of the operating elements in accordance with respectively adjustable combinations of operating modes of the driver assistance systems. Therefore, the operating elements are no longer used to control individual driver assistance systems but instead groups or clusters of driver assistance systems which are to be defined and which can possibly be adapted specifically by a user are controlled. The driver assistance systems which are each combined to form a group can be respectively operated in different operating modes, wherein the respectively adjustable combinations of the operating modes correspond to corresponding automation of one or more tasks of the vehicle control system.

As a result of the proposed combination of the operating elements to form an operating group and assignment of these operating elements to a group of driver assistance systems, it is possible overall to achieve more clearly organized configuration of the driver's workstation. As a result of the situation-adapted assignment of functions to the respective operating elements in accordance with the respective operating modes of the driver assistance systems the total number of necessary operating elements for controlling the driver assistance systems can be considerably reduced. As a result of the more clearly organized configuration of the driver's workstation, improved control of the driver assistance systems is made possible, wherein at the same time the driver is distracted less from events on the road during the control of the driver assistance systems, with the result that overall safe operation of the motor vehicle is made possible.

In one advantageous embodiment, the operating elements each comprise a display device which is configured to display the function of the respective operating element which is correspondingly assigned in accordance with the respectively set combination of the operating modes of the driver assistance systems. The operating elements can preferably be arranged in the driver's field of vision, with the result that the display of the respectively assigned function of the operating elements informs the driver at all times as to which operating elements said driver can use to actuate the respective driver assistance systems and in what way. The operating elements can optionally be arranged in the entire driver's operating area.

In a further advantageous embodiment there is provision that at least one of the operating elements is configured to change the operating mode of at least one of the driver assistance systems in accordance with the respectively set combination of operating modes of the driver assistance systems. In other words, the driver can change the operating modes of the driver assistance systems at any time by activating the corresponding operating element, with the result that the driver can set the desired degree of automation of the driver assistance systems as desired at any time.

According to a further advantageous embodiment there is provision that the respective display devices are configured to display a color allocated to the respective combinations, in accordance with the respectively set combination of the operating modes of the driver assistance systems. As a result, the operating mode in which the respective driver assistance systems are currently being operated is signaled in a particularly easy way to the driver at all times, with the result that the driver is informed as to which assistance functions of the driver assistance systems are instantaneously assisting him.

The respective display devices preferably comprise a plurality of organic light-emitting diodes which are configured to display, in accordance with the respectively set combination of the operating modes of the driver assistance systems, the function, which is correspondingly assigned to the respective operating elements, as lettering or as a symbol in a color which is allocated to the respective combinations. As a result, the control and operation of the driver assistance systems and the driving of the motor vehicle are made easier and improved overall.

According to a further advantageous embodiment there is provision that the operating elements are embodied as a pushbutton key, a rotary element or the like. In other words there is provision that the operating elements are arranged as actual switches, and not only as virtual switches, within reach of the driver.

In a further advantageous embodiment, the operating elements are configured to operate a driver assistance system, which is embodied as an adaptive cruise control system, and a driver assistance system, which is embodied as a lane departure warning system. The adaptive cruise control system and the lane departure warning system can be operated here in different degrees of automation, wherein the functionalities thereof can supplement one another in assisting the driver. By the operating elements, both the adaptive cruise control system and the lane departure warning system can be correspondingly actuated here, depending on the current operating mode of the driver assistance systems, wherein the operating elements simultaneously permit the respective operating modes of said driver assistance systems to be changed.

The inventors also propose a motor vehicle that comprises the proposed operating system or an advantageous embodiment of the proposed operating system.

According to one advantageous refinement of the motor vehicle, there is provision that the operating elements are arranged on a steering wheel of the motor vehicle. This ensures that the operating elements are arranged directly in the driver's field of vision, with the result that the operating elements can be activated without the driver having to avert his gaze from the roadway. This promotes safe driving of the motor vehicle decisively. Additionally or alternatively, the operating elements can also be arranged in another operating area of the passenger compartment of the vehicle which is accessible to the driver, for example in the region of the center console or the like.

The features and feature combinations specified above in the description and the features and feature combinations specified below in the description of the figures and/or shown solely in the figures can be used not only in the respectively specified combination but also in other combinations or alone, without departing from the scope.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
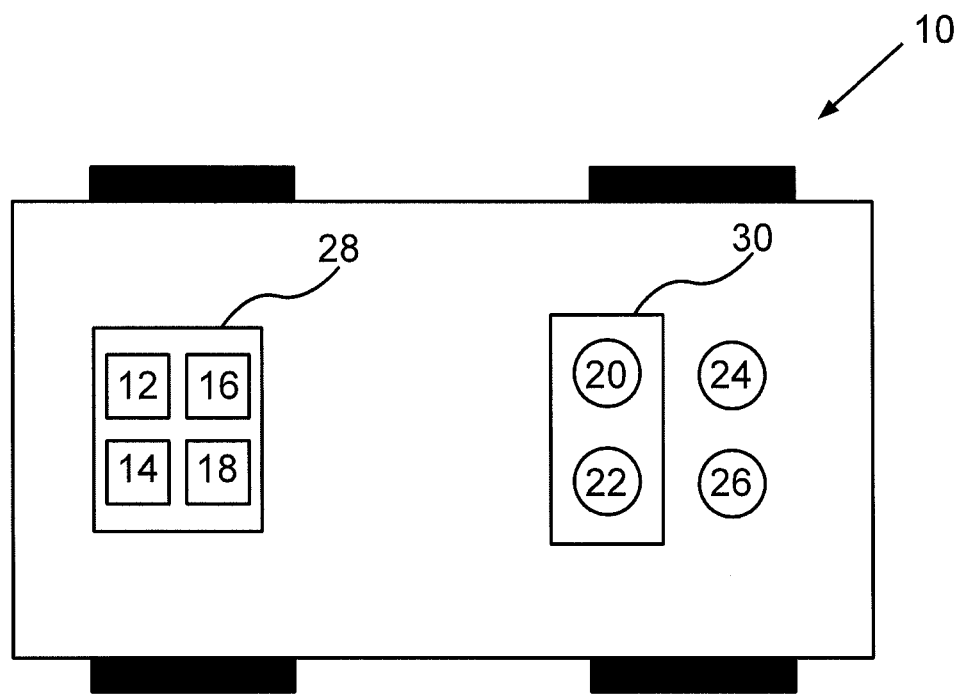
FIG. 1 shows a schematic illustration of a motor vehicle having a plurality of operating elements which are combined to form an operating group, and a plurality of driver assistance systems, wherein two of the driver assistance systems are assigned to a group and can be controlled by the operating elements.

Reference will now be made in detail to the preferred embodiments of the present invention, examples of which are illustrated in the accompanying drawings, wherein like reference numerals refer to like elements throughout.

A motor vehicle 10 having a plurality of operating elements 12, 14, 16, 18 and a plurality of driver assistance systems 20, 22, 24, 26 is shown in a schematic illustration in FIG. 1. The operating elements 12, 14, 16, 18 are assigned to an operating group 28 in the present case. The driver assistance systems 20, 22 are combined here to form a group 30 or assigned thereto. In the present case, the driver assistance system 20 is an adaptive cruise control system, and the driver assistance system 22 is a lane departure warning system, wherein the driver assistance systems 20, 22, 24, 26 can essentially be any desired driver assistance systems which can be used to assist a driver of the motor vehicle 10.

The operating elements 12, 14, 16, 18 which are assigned to the operating group 28 are configured exclusively for operating the driver assistance systems 20, 22 which are assigned to the group 30. The driver assistance systems 20, 22 can be operated here in respectively adjustable combinations of different operating modes, wherein in each case a corresponding function for operating the driver assistance systems 20, 22 is assigned to the operating elements 12, 14, 16, 18.

The operating modes may be, for example, different activation stages in which the driver assistance systems 20, 22 can be operated, wherein depending on the operating mode or activation stage the driver assistance systems 20, 22 can intervene with a different level of automation in order to assist the driver in operating the motor vehicle 10. A first activation stage may be, for example, purely manual driving in which neither the adaptive cruise control system 20 nor the lane departure warning system 22 is activated. In this case, a function for activating the adaptive cruise control system 20 can be assigned for example solely to the operating element 12, wherein the further operating elements 14, 16, 18 are not assigned a function for the operation of the adaptive cruise control system 20 or the lane departure warning system 22.

After activation of the operating element 12, the adaptive cruise control system 20 is activated in such a way that assisted longitudinal guidance is provided by the adaptive cruise control system 20, wherein the lane departure warning system 22 continues to not be activated. This combination of the operating modes corresponds to a second activation stage. In this case, the operating element 12 is allocated the function that the lane departure warning system 22 is switched on by activating the operating element 12. In this context, the operating element 14 is allocated the function that when the operating element 14 is activated the system switches back into the activation stage 1, which, as already mentioned, corresponds to purely manual driving. The operating elements 16, 18 are configured in the present combination of the operating modes or in the present second activation stage to increase or reduce a desired set speed of the adaptive cruise control system 20.

By activating the operating element 12, switching over is performed from the second activation stage into a third activation stage in which the assisted longitudinal guidance by the adaptive cruise control system 20 continues to be activated, wherein the lane departure warning system 22 is now also switched on. For example, the lane departure warning system 22 outputs a warning to a driver of the motor vehicle 10 when departure from a lane occurs, or there is a risk of such departure. However, an active steering intervention by the lane departure warning system 22 does not take place in this third activation stage. The operating elements 16, 18 continue to be configured in the present combination of the operating modes or in the present third activation stage to increase or reduce a desired set speed of the adaptive cruise control system 20. The operating element 14 serves to switch back from the third activation stage into the second activation stage again.

By activating the operating element 12, the system is switched from the third activation stage into a fourth activation stage in which fully automated longitudinal and transverse guidance is provided by the driver assistance systems 20, 22 which have been changed into the corresponding operating mode. In the fourth activation stage, the adaptive cruise control system 20 automatically regulates the velocity of the motor vehicle 10 in accordance with the traffic situation, that is to say in particular in accordance with further vehicles or obstacles ahead. The lane departure warning system 22 fully automatically regulates the transverse guidance of the motor vehicle 10, wherein the lane departure warning system 22 can automatically carry out corresponding steering movements at the motor vehicle 10, in order, for example, to keep to a predefined lane. In this fourth activation stage, the operating element 12 is without a function, and the operating element 14 serves to switch back from the fourth activation stage into the third activation stage again, or optionally also into the second or first activation stage. The operating elements 16, 18 serve, for example, to allow maneuvers to be carried out in the sense of lane changes to the right or to the left by the lane departure warning system 22.

The grouping of the operating elements 12, 14, 16, 18 to form the operating group 28, shown in FIG. 1, can either be preset at the works and/or can also be performed in a user-specific fashion. The assignment of the driver assistance systems 20, 22 to the group 30 can also be already preset at the works or it is additionally likewise possible that a grouping of the driver assistance systems 20, 22, 24, 26 differing from the illustration shown here can occur. The functional assignment to the operating elements 12, 14, 16, 18 as a function of the respectively adjustable combinations of operating modes of the driver assistance systems 20, 22, 24, 26 can likewise be preset at the works or else optionally set in a user-specific fashion.

Figure 2:
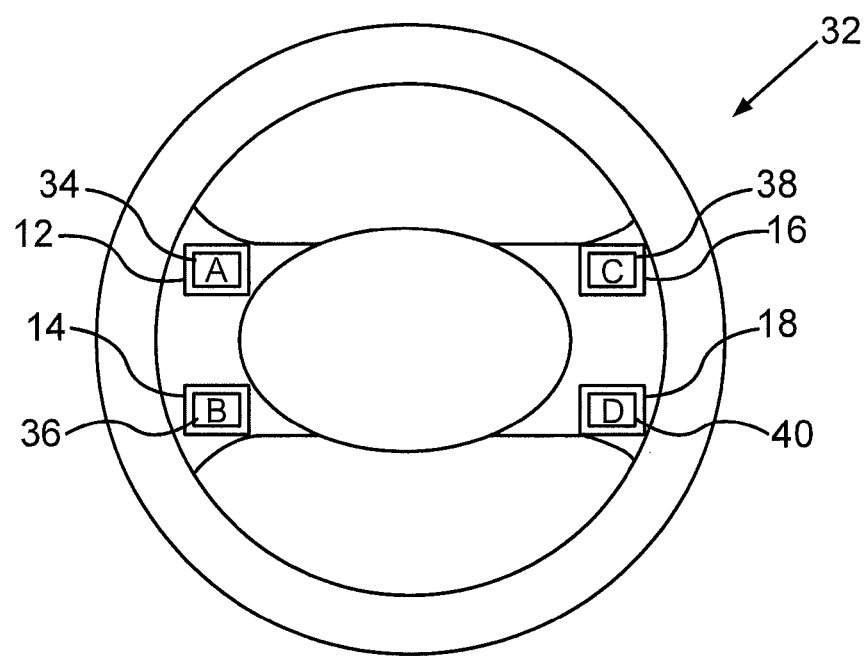
FIG. 2 shows a schematic illustration of a steering wheel for a motor vehicle, wherein the operating elements shown in FIG. 1 are arranged on the steering wheel.

FIG. 2 shows a steering wheel 32 on which the operating elements 12, 14, 16, 18 shown in FIG. 1 are arranged. The operating elements 12, 14, 16, 18 each comprise a display device 34, 36, 38, 40. In the present case, the display devices 34, 36, 38, 40 are embodied as displays with a plurality of organic light-emitting diodes (not illustrated here), which are configured to display, in accordance with the respectively set combination of the operating modes of the driver assistance systems 20, 22, the function which is correspondingly assigned to the respective operating elements 12, 14, 16, 18 as lettering or a symbol A, B, C, D in a color which is allocated to the respective combinations. In other words, the display devices 34, 36, 38, 40 indicate, depending on the operating mode or activation stage of the driver assistance systems 20, 22, what effect an activation of the operating elements 12, 14, 16, 18 respectively has on the driver assistance systems 20, 22. Furthermore, the color designation of the respective operating elements 12, 14, 16, 18, which is respectively carried out specifically in accordance with which operating mode the driver assistance systems 20, 22 are instantaneously being operated in, makes it easily possible to indicate to a driver of the motor vehicle 10 the current operating mode of the driver assistance systems 20, 22 in an easy way at all times. In the present case, the operating elements 12, 14, 16, 18 are embodied as pushbutton keys, wherein the operating elements 12, 14, 16, 18 can, for example, also be embodied as rotary elements, as touch elements or the like, or as combinations thereof.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. An operating system for a motor vehicle, comprising:
a plurality of operating elements assigned to an operating group, the operating elements being configured exclusively for operating driver assistance systems assigned to a system group, the driver assistance systems provided to control movement of the motor vehicle, wherein the driver assistance systems have a plurality of operating modes, each corresponding to automation of one or more tasks of a vehicle control system, the operating system is associated with a plurality of combinations of operating modes, and a corresponding function for operating the driver assistance systems is assigned to each of the operating elements in accordance with a currently set combination of operating modes.

2. The operating system as claimed in claim 1, wherein the operating elements comprise a plurality of display devices, each display device having a respective corresponding operating element, each display device presents a display corresponding to the function of the respective operating element, and both the function of each operating element and the display of each display device correspond with the currently set combination of the operating modes.

3. The operating system as claimed in claim 1, wherein for each combination of the operating modes, a currently active operating mode provides a degree of driver assistance for automation of one or more tasks of a vehicle control system, and at least one of the operating elements is configured to change the currently active operating mode.

4. The operating system as claimed in claim 3, wherein changing the currently active operating mode also changes the currently set combination of operating modes.

5. An operating system for a motor vehicle, comprising:
a plurality of operating elements assigned to an operating group, the operating elements being configured exclusively for operating driver assistance systems assigned to a system group, wherein the driver assistance systems have a plurality of operating modes, each corresponding to automation of one or more tasks of a vehicle control system, the operating system is associated with a plurality of combinations of operating modes, and a corresponding function for operating the driver assistance systems is assigned to each of the operating elements in accordance with a currently set combination of operating modes, wherein the combinations of operating modes comprise a lane departure warning combination, the lane departure warning combination comprises a combination of an assisted longitudinal guidance mode, a lane departure warning mode and a fully automatic longitudinal and transverse guidance mode, in the lane departure warning combination, a currently active operating mode is the lane departure warning mode, in the lane departure warning combination, a first operating element has a switch up function to switch to the fully automatic longitudinal and transverse guidance mode as the currently active operating mode, and in the lane departure warning combination, a second operating element has a switch down function to switch to the assisted longitudinal guidance mode as the currently active operating mode.

6. An operating system for a motor vehicle, comprising:
a plurality of operating elements assigned to an operating group, the operating elements being configured exclusively for operating driver assistance systems assigned to a system group, wherein
the driver assistance systems have a plurality of operating modes, each corresponding to automation of one or more tasks of a vehicle control system,
the operating system is associated with a plurality of combinations of operating modes, and
a corresponding function for operating the driver assistance systems is assigned to each of the operating elements in accordance with a currently set combination of operating modes,
wherein
the combinations of operating modes comprise an assisted longitudinal guidance combination,
the assisted longitudinal guidance combination comprises a combination of a manual driving mode, an assisted longitudinal guidance mode and a lane departure warning mode,
in the assisted longitudinal guidance combination, a currently active operating mode is the assisted longitudinal guidance mode,
in the assisted longitudinal guidance combination, a first operating element has a switch up function to switch to the lane departure warding mode as the currently active operating mode, and
in the assisted longitudinal guidance combination, a second operating element has a switch down function to switch to the manual driving mode as the currently active operating mode.

7. The operating system as claimed in claim 6, wherein
in the assisted longitudinal guidance combination, a third operating element increases a set speed of an adaptive cruise control system, and
in the assisted longitudinal guidance combination, a fourth operating element reduces the set speed of the adaptive cruise control system.

8. The operating system as claimed in claim 2, wherein
a different color is allocated to each combination of operating modes, and
the display devices display the color allocated to the currently set combination of the operating modes.

9. The operating system as claimed in claim 2, wherein
a different color is allocated to each combination of operating modes,
each display device comprises a plurality of organic light-emitting diodes,
the organic light-emitting diodes of each display device, display the function of the respective operating element as lettering or as a symbol, and
the lettering or the symbol is displayed in the color allocated to a currently set combination of the operating modes.

10. The operating system as claimed in claim 1, wherein
at least one of the operating elements is embodied as a pushbutton key.

11. The operating system as claimed in claim 1, wherein
at least one of the operating elements is embodied as a rotary element.

12. The operating system as claimed in claim 1, wherein
at least one of the operating elements is embodied as a pushbutton key, and
at least one of the operating elements is embodied as a rotary element.

13. The operating system as claimed in claim 1, wherein
the operating elements operate the driver assistance systems, and
the driver assistance systems comprise an adaptive cruise control system and a lane departure warning system.

14. The operating system as claimed in claim 1, wherein
the operating modes of the driver assistance systems comprise a manual driving mode, an assisted longitudinal guidance mode, a lane departure warning mode and a fully automatic longitudinal and transverse guidance mode, and
the assisted longitudinal guidance mode is provided by an adaptive cruise control system.

15. The operating system as claimed in claim 1, wherein
the combinations of operating modes comprise a combination of a manual driving mode, an assisted longitudinal guidance mode and a lane departure warning mode.

16. The operating system as claimed in claim 1, wherein
the combinations of operating modes comprise a combination of an assisted longitudinal guidance mode, a lane departure warning mode and a fully automatic longitudinal and transverse guidance mode.

17. The operating system as claimed in claim 1, wherein
the operating modes of the driver assistance systems differ from one another in terms of a degree of independence of automatic driving,
a first operating element has a function of increasing the degree of independence of automatic driving, and
a second operating element has a function of decreasing the degree of independence of automatic driving.

18. The operating system as claimed in claim 1, wherein
each operating mode of the currently set combination of operating modes has at least one parameter that can be altered by at least one of the operating elements.

19. A motor vehicle comprising:
driver assistance systems to control movement of the motor vehicle and assigned to a system group; and
an operating system, the operating system comprising:
a plurality of operating elements assigned to an operating group, the operating elements being configured exclusively for operating the driver assistance systems assigned to a system group, wherein
the driver assistance systems have a plurality of operating modes, each corresponding to automation of one or more tasks of a vehicle control system,
the operating system is associated with a plurality of combinations of operating modes, and
a corresponding function for operating the driver assistance systems is assigned to each of the operating elements in accordance with a currently set combination of operating modes.

20. The motor vehicle as claimed in claim 19, wherein
the operating elements are arranged on a steering wheel of the motor vehicle.

* * * * *